No. 790,063. PATENTED MAY 16, 1905.
K. LANGE.
DOUBLE BICYCLE FOR LOOPING THE LOOP.
APPLICATION FILED MAR. 24, 1904.
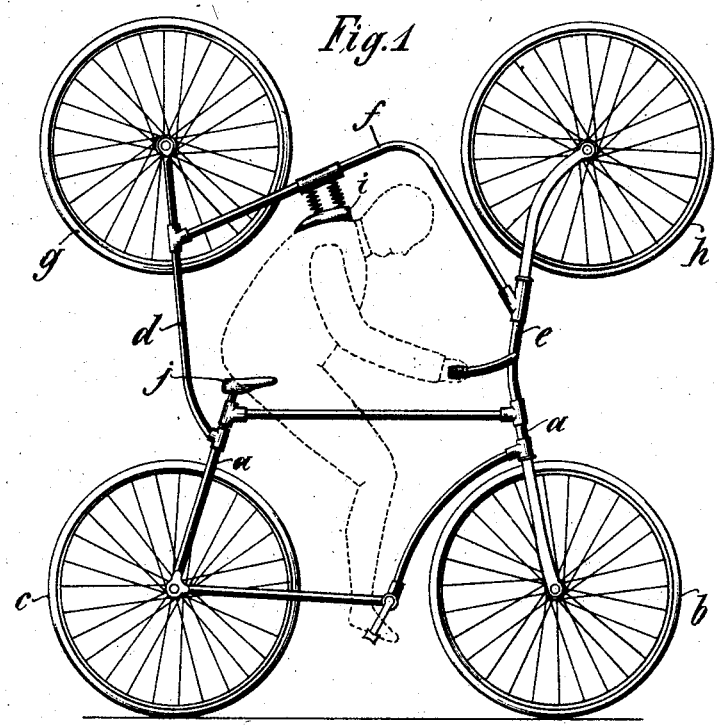
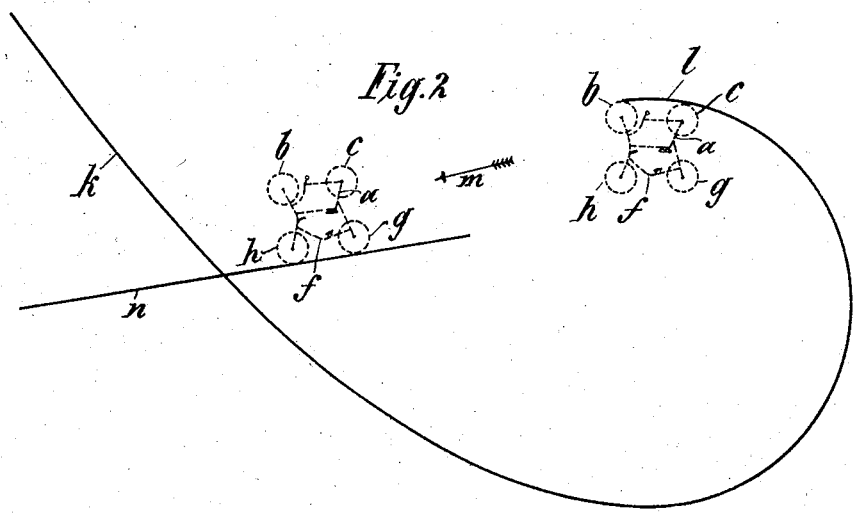
Witnesses:
Inventor:
Karl Lange
BY Edgar Tate & Co.
ATTORNEYS No. 790,063. Patented May 16, 1905.

UNITED STATES PATENT OFFICE.

KARL LANGE, OF BERLIN, GERMANY.

DOUBLE BICYCLE FOR LOOPING THE LOOP.

SPECIFICATION forming part of Letters Patent No. 790,063, dated May 16, 1905.

Application filed March 24, 1904. Serial No. 199,670.

*To all whom it may concern:*

Be it known that I, KARL LANGE, a subject of the German Emperor, residing at No. 66 Warschauerstrasse, Berlin, Germany, have invented new and useful Improvements in Double Bicycles for Looping the Loop, of which the following is a description.

The present invention consists of a double bicycle for looping the loop for circus and other performances.

The object is to provide a cycle by means of which a mutilated loop may be traversed, the performer springing, with the wheel, off the end of the loop while head downward and running off onto a track leading out of the loop on the two upper wheels of the cycle head downward.

In order to render the present specification easily intelligible, reference is had to the accompanying drawings, in which similar letters of reference denote similar parts throughout both the views.

Figure 1 is a side elevation of the double bicycle, and Fig. 2 is a diagram showing the method of traveling over the loop.

The lower part of the machine constitutes an ordinary bicycle consisting of the wheels $c$ and $b$, mounted in the frame $a$, which is provided with a seat $j$. Connected to the frame $a$ and mounted in the same plane as the wheels $b$ and $c$ are the upper wheels $g$ and $h$, supported in the frame $d\ e\ f$ after the manner of a second bicycle turned upside down, the bar $f$ of the upper frame carrying a cushion $i$, adapted to rest on the back or shoulders of the rider, so that when the latter is on the seat $j$ he will be within the frame $a\ d\ e\ f$, riding on the two wheels $b$ and $c$ and carrying the wheels $g$ and $h$ above his head, the handle-bar serving to steer both the front wheels $b$ and $h$.

In traversing the mutilated loop the rider descends the incline $k$ and runs round the loop as far as the point $l$, where it is broken. Here the wheel leaves the loop, the rider alighting on the track $n$ upside down and the wheel running on the upper wheels $g$ and $h$, in which position the performer leaves the stage or track.

Besides the cushion $i$ the frame may be padded at other points, if considered necessary, and more than two wheels may in some cases be mounted on the upper part of the frame.

I claim as my invention—

1. A cycle for looping a mutilated loop consisting of a frame having two wheels mounted on the lower part and two wheels mounted above the head of the rider, a saddle on the lower frame and a cushion on the upper frame to brace the rider, substantially as described.

2. A cycle for looping a mutilated loop, consisting of a frame, a pair of wheels mounted in the bottom portion of the frame and a pair of wheels mounted in the top portion of the frame, a saddle in the central portion of the frame, and a cushion in the top portion of the frame to brace the rider, said wheels being all in the same plane, substantially as shown and described.

In witness whereof I have hereunto set my hand in presence of two witnesses.

KARL LANGE.

Witnesses:
 WOLDEMAR HAUPT,
 HENRY HASPER.